United States Patent
Nakamura et al.

(10) Patent No.: US 11,322,764 B2
(45) Date of Patent: May 3, 2022

(54) PROTON CONDUCTING FILM HAVING CROSSLINKED STRUCTURE AND FUEL CELL

(71) Applicants: TOYOTA JIDOSHA KABUSHIKI KAISHA, Toyota (JP); National University Corporation Nagoya University, Nagoya (JP)

(72) Inventors: Naoki Nakamura, Shizuoka-ken (JP); Atsushi Noro, Nagoya (JP); Takato Kajita, Nagoya (JP); Haruka Tanaka, Nagoya (JP); Yushu Matsushita, Nagoya (JP)

(73) Assignees: TOYOTA JIDOSHA KABUSHIKI KAISHA, Toyota (JP); NATIONAL UNIVERSITY CORPORATION NAGOYA UNIVERSITY, Nagoya (JP)

( * ) Notice: Subject to any disclaimer, the term of this patent is extended or adjusted under 35 U.S.C. 154(b) by 383 days.

(21) Appl. No.: 16/656,908

(22) Filed: Oct. 18, 2019

(65) Prior Publication Data
US 2020/0136164 A1    Apr. 30, 2020

(30) Foreign Application Priority Data
Oct. 24, 2018   (JP) .............................. JP2018-200436

(51) Int. Cl.
*H01M 8/1023*    (2016.01)
*C08F 293/00*    (2006.01)
(Continued)

(52) U.S. Cl.
CPC ....... *H01M 8/1023* (2013.01); *C08F 293/005* (2013.01); *H01M 8/0258* (2013.01);
(Continued)

(58) Field of Classification Search
CPC .......................... H01M 8/1023; H01M 8/0258
See application file for complete search history.

(56) References Cited

U.S. PATENT DOCUMENTS 7,576,165 B2 *   8/2009   Li .......................... C08F 228/02
                                                             526/258
2010/0098997 A1   4/2010   Ohgi et al.
(Continued)

FOREIGN PATENT DOCUMENTS

| JP | 2011-198477 A | 10/2011 |
| JP | 2018-190647 A | 11/2018 |

(Continued)

OTHER PUBLICATIONS

Kajita, Takato et al., Acidic liquid-swollen polymer membranes exhibiting anhydrous proton conductivity higher than 100 mS cm$^{-1}$ at around 100 ° C, J. Mater. Chem. A, vol. 7, No. 26, Jul. 2, 2019, pp. 15585-15592.

*Primary Examiner* — Helen Oi K Conley
(74) *Attorney, Agent, or Firm* — Dickinson Wright, PLLC

(57) ABSTRACT

A proton conducting film includes a polymer having a first part and a second part which are connected by a covalent bond and a plasticizer. The first parts aggregate with each other to form a domain at an operation temperature of the proton conducting film, and the second part crosslinks the domains. The second part has a proton accepting group, and the plasticizer contains a proton donating compound having a pKa of 2.5 or less, and thus the plasticizer penetrates into the second part, and a glass transition temperature of the polymer is lowered compared to when the plasticizer is not included.

15 Claims, 4 Drawing Sheets

(51) Int. Cl.
*H01M 8/0258* (2016.01)
*H01M 8/10* (2016.01)

(52) U.S. Cl.
CPC . *C08F 2438/03* (2013.01); *H01M 2008/1095* (2013.01); *H01M 2300/0082* (2013.01)

(56) References Cited

U.S. PATENT DOCUMENTS

| | | |
|---|---|---|
| 2015/0228994 A1 | 8/2015 | Toshinari et al. |
| 2019/0109343 A1 | 4/2019 | Noro et al. |
| 2019/0245234 A1 | 8/2019 | Nakamura et al. |

FOREIGN PATENT DOCUMENTS

| | | |
|---|---|---|
| JP | 2019-135715 A | 8/2019 |
| KR | 1020090112674 A | 10/2009 |
| KR | 1020150047492 A | 5/2015 |
| WO | 2010/047329 A1 | 4/2010 |
| WO | 2017/183397 A1 | 10/2017 |

\* cited by examiner

PROTON CONDUCTING FILM HAVING CROSSLINKED STRUCTURE AND FUEL CELL

INCORPORATION BY REFERENCE

The disclosure of Japanese Patent Application No. 2018-200436 filed on Oct. 24, 2018 including the specification, drawings and abstract is incorporated herein by reference in its entirety.

BACKGROUND

1. Technical Field

The present disclosure relates to a proton conducting film and a fuel cell.

2. Description of Related Art

In the related art, regarding proton conducting films used for electrolyte materials for a fuel cell, for example, perfluorosulfonic acid resin films such as Nafion (registered trademark, the same hereinafter) are known. However, in order to realize high proton conductivity with such a perfluorosulfonic acid resin film, the presence of water is essential. Therefore, in a fuel cell including such a perfluorosulfonic acid resin film, it is necessary to limit an operation temperature to less than a boiling point of water.

Therefore, proton conducting films that can be used in a low humidity or anhydrous environment have been developed.

For example, in Japanese Unexamined Patent Application Publication No. 2011-198477 (JP 2011-198477 A), a proton conducting film as a solid electrolyte containing a block copolymer including a silicone polymer having a phosphate group and another silicone polymer is disclosed.

In addition, WO 2010/047329 discloses a proton conducting film as an electrolyte including a composition which includes a block copolymer having polymer blocks (A) and (B) which are phase-separated from each other as structural components and in which the polymer block (A) has an ion conducting group and the polymer block (B) forms a soft phase, and the ion conducting group is substantially present only in the polymer block (A) in the block copolymer, and a metal phosphate having ion conductivity.

In addition, WO 2017/183397 discloses a proton conducting film including a polymer which has a glass or crystalline first part having a glass transition temperature or melting temperature that is higher than an operation temperature of a proton conducting film and a second part having a functional group that can non-covalently bond to other molecules, and a proton conducting substance including a proton releasing and binding part which can release protons and having a functional group that can non-covalently bond to the second part of the polymer and a proton coordination part which can be coordinated to protons separately in different molecules that interact with each other or in the same molecule, and which exhibits proton conductivity in a non-humidified state. In addition, the glass transition temperature of the proton conducting mixed phase including the second part to which the proton releasing and binding part of the proton conducting substance is bonded and the proton conducting substance is lower than an operation temperature of the proton conducting film, and an amount of the proton releasing and binding part is more than that of the second part of the polymer.

SUMMARY

However, the proton conductivity of proton conducting films that can be used in a low humidity or anhydrous environment, which have been reported so far, is not sufficient, and it still needs to be improved.

The present disclosure provides a proton conducting film that exhibits high proton conductivity in a low humidity or anhydrous environment.

According to an aspect of the present disclosure, there is provided a proton conducting film. The proton conducting film includes a polymer having a first part and a second part which are connected by a covalent bond, and a plasticizer. The first parts aggregate with each other to form a domain at an operation temperature of the proton conducting film, and the second part crosslinks the domains. The second part has a proton accepting group, and the plasticizer contains a proton donating compound having a pKa of 2.5 or less, and thus the plasticizer penetrates into the second part, and a glass transition temperature of the polymer is lowered compared to when the plasticizer is not included.

In the above aspect, the domain may be in a glass state or crystalline state.

In the above aspect, the polymer may be a block copolymer, the first part may be a block A of the block copolymer, and the second part may be a block B of the block copolymer.

In the above aspect, a molar ratio of the proton donating compound to the proton accepting group may be 1.0 or more and 10.0 or less.

In the above aspect, the proton conducting film may be a viscoelastic solid in a temperature range of 50° C. or higher and 100° C. or lower.

In the above aspect, a content of the plasticizer may be 50 parts by mass or more and 90 parts by mass or less with respect to a total of 100 parts by mass of the polymer and the plasticizer.

In the above aspect, the proton donating compound may be at least one selected from among sulfuric acid and phosphoric acid.

In the above aspect, the proton accepting group may be a nitrogen-containing heterocyclic group.

In the above aspect, the nitrogen-containing heterocyclic group may be a pyridine ring group or an imidazole ring group.

In the above aspect, the first part may be a polystyrene-based polymer.

In the above aspect, the block copolymer may be an A-B-A type triblock copolymer including the block A and the block B.

In the above aspect, a film thickness of the proton conducting film may be 1.00 mm or less.

In the above aspect, a proton conductivity of the proton conducting film at 50° C. may be 10 mS/cm or more.

In the above aspect, an ionic interaction may occur between free protons released from the proton donating compound, the proton donating compound which is anionized due to release of protons, and the proton accepting group which is cationized due to binding to the free protons.

According to another aspect of the present disclosure, there is provided a fuel cell. The fuel cell comprises a fuel electrode side separator having a fuel flow path, a fuel electrode side catalyst layer, the proton conducting film, an air electrode side catalyst layer, and an air electrode side separator having an air flow path.

The proton conducting film of the present disclosure can exhibit high proton conductivity even in a low humidity or anhydrous environment.

Therefore, the proton conducting film of the present disclosure is particularly suitable for use as a proton conducting film in a fuel cell.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
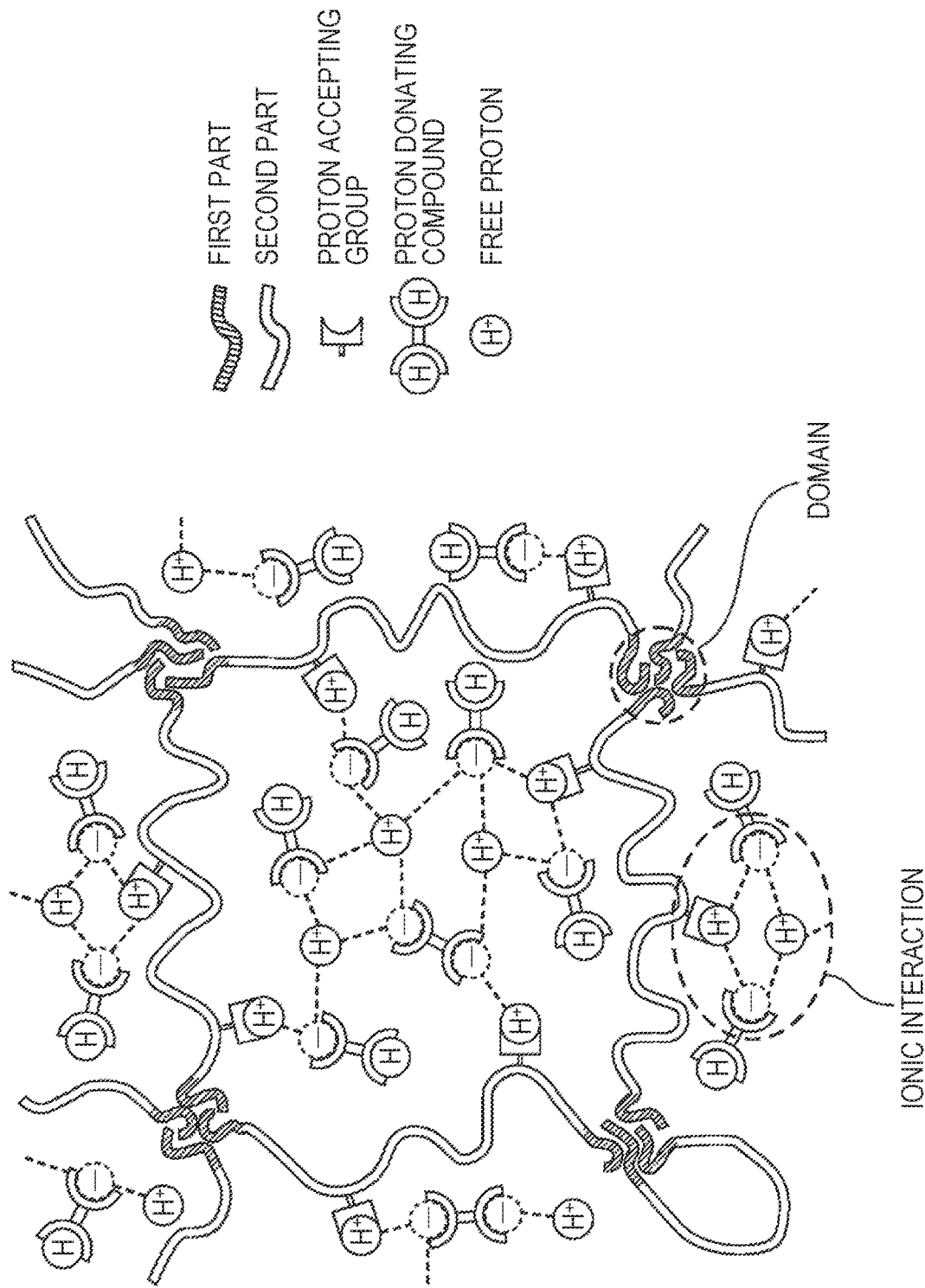
FIG. 1 is a schematic view for illustrating a mechanism by which a proton conducting film of the present disclosure exhibits its functions.

A proton conducting film of the present disclosure is a proton conducting film which includes a polymer having a first part and a second part which are connected by a covalent bond, and a plasticizer, wherein the first parts aggregate with each other to form a domain at an operation temperature of the proton conducting film, and the second part crosslinks the domains. The second part has a proton accepting group, and the plasticizer contains a proton donating compound having a pKa of 2.5 or less, and thus the plasticizer penetrates the second part, and the glass transition temperature of the polymer is lowered compared to when the plasticizer is not included.

In the present disclosure, the "operation temperature of the proton conducting film" is a temperature at which a proton conducting film is used, and is, for example, room temperature or higher or 50° C. or higher, and can be a desired temperature in a range of 200° C. or lower, 150° C. or lower, or 120° C. or lower.

The term "domain" refers to a part in which first parts of polymers aggregate due to an intermolecular force other than a covalent bond, and is an aggregated part that reversibly occurs in response to changes in the environment such as a temperature. Here, examples of intermolecular forces other than a covalent bond include a van der Waals force, a charge transfer force, a Coulomb force, a hydrophobic bonding force, a hydrogen bonding force, an ion bonding force, a coordination bonding force, and combinations thereof, but the present disclosure is not limited thereto.

In the present disclosure, in the operation temperature of the proton conducting film, the domain formed by aggregation of first parts of polymers may be in a glass state or a crystalline state. Here, the "glass state" refers to an amorphous solid state. Here, it is possible to determine whether the domain is in a glass state or a crystalline state by measurement using a differential scanning calorimeter (DSC). More specifically, when an endothermic step is observed (a peak may be observed), the state is a "glass state," and when there is no endothermic step and only a sharp endothermic peak is observed, the state is a "crystalline state."

"Crosslinked" refers to a structure in which the second part of the polymer crosslinks the domains.

Therefore, in the proton conducting film of the present disclosure, at its operation temperature, a first part forming the "domain" described above and the second part that performs "crosslinking" form a crosslinked structure as a whole.

Here, as long as effects of the present disclosure are not impaired, the polymer of the present disclosure may include chemical crosslinking (covalent crosslinking), and may form chemical crosslinking after a proton conducting film including only physical crosslinking is produced.

Preferably, a plasticizer including a proton donating compound related to proton transport dissolves well in the second part as a polymer and sufficiently penetrates therein. Here, "dissolve well" means that respective molecules (a plasticizer, and a second part as a polymer) are "mixed" spontaneously at a molecular level, and a Gibbs energy $\Delta_{mix}G$ of mixing is a negative value with a large absolute value. Since it can be shown that $\Delta_{mix}G = \Delta_{mix}H - T\Delta_{mix}S$ ($\Delta_{mix}H$ is the enthalpy of mixing, $\Delta_{mix}S$ is the entropy of mixing, and T is an absolute temperature during mixing), when $\Delta_{mix}H$ is a negative and large absolute value and $T\Delta_{mix}S$ is a large positive value, $\Delta_{mix}G$ becomes a negative and large absolute value, and thus mixing is performed well at a molecular level, and when the plasticizer is a liquid, a well-dissolved state is realized.

In addition, "penetration" is promoted when $\Delta_{mix}G$ of a permeable medium (generally, a liquid) and a penetrating medium is a negative value with a large absolute value, when simply by bringing a permeable medium into contact with a medium not having penetrating thereinto, the permeable medium spontaneously penetrates into the medium not having penetrating thereinto, and uniform mixing at a molecular level is realized. When the permeable medium is a plasticizer and the penetrating medium is a polymer, generally, the value of $\Delta_{mix}G$ depends mainly on the magnitude of $\Delta_{mix}S$ which is positive, but even if the value is negative, its absolute value is not large, and thus there is no significant penetration.

However, in the case of the present disclosure, since the second part is a flexible polymer in which conformational change is likely to occur and which has a proton accepting group, and the plasticizer contains a proton donating compound having a pKa of 2.5 or less, they become a pair causing an ionic attractive interaction between the proton accepting group of the second part and the proton donating compound. Considering mixing of the second part which is a flexible polymer in which conformational change is likely to occur and the plasticizer, since $T\Delta_{mix}S$ can be a positive value in an intermediate level, which is derived from the flexibility of the second part, $\Delta_{mix}G$ is a negative value. In addition, since the second part and the plasticizer become a pair that generate heat when mixed, $\Delta_{mix}H$ becomes a negative value with a large absolute value depending on the number of pairs, and $\Delta_{mix}G$ also becomes a negative value with a large absolute value due to contribution of the ionic attractive interaction, and the plasticizer is more likely to "penetrate" into the second part. In addition, since the negative $\Delta_{mix}G$ is maintained due to contribution of an ionic attractive interaction between the proton accepting group of the second part and the proton donating compound in the plasticizer even after penetration, the plasticizer does not naturally penetrate out thereof.

The "plasticizer" can lower the glass transition temperature of the polymer. Here, in the present disclosure, the glass transition temperature of the polymer corresponds to the glass transition temperature of the second part of the polymer.

The proton conducting film of the present disclosure can exhibit high proton conductivity even in a low humidity or anhydrous environment. A mechanism by which the proton conducting film of the present disclosure exhibits its function will be described with reference to FIG. 1. However, the mechanism to be described below does not limit the present disclosure.

FIG. 1 is a schematic view for illustrating a mechanism by which the proton conducting film of the present disclosure exhibits its function.

The proton conducting film in FIG. 1 includes a polymer having a first part and a second part which are connected by a covalent bond, and a plasticizer. The first parts aggregate with each other to form a domain at an operation temperature of the proton conducting film. Then, in the proton conducting film, the second part crosslinks the domains formed by the first parts. Thereby, the shape of the film is maintained.

In addition, in the proton conducting film of the present disclosure having such a structure, since first parts can be regularly and periodically disposed in a nanometer order, its elongation at break and/or tensile strength can be larger than those of a proton conducting film including crosslinking with irregularly and aperiodically disposed covalent bonds. In addition, such a proton conducting film can be produced by a solvent casting method, a spin coating method, or a hot melt method. Therefore, the proton conducting film of the present disclosure can be made smoother and thinner than proton conducting films of the related art and moreover, it is easy to increase the area.

In addition, the plasticizer according to the present disclosure includes a proton donating compound having a pKa of 2.5 or less. Protons can be released from such a proton donating compound. When protons are released, the proton donating compound becomes anions. In addition, since there is a proton accepting group in the second part of the polymer, some free protons can bind to the proton accepting group. Accordingly, the proton accepting group of the second part becomes cations. As shown in FIG. 1, in the proton conducting film of the present disclosure, an ionic interaction occurs between the anionized proton donating compound, free protons, and the cationized proton accepting group. Such an ionic interaction occurs throughout the entire proton conducting film, free protons can easily move even in an anhydrous environment. That is, high proton conductivity can be imparted to the proton conducting film of the present disclosure.

In addition, since an ionic interaction occurs between anions and cations formed in this manner, the proton donating compound having a pKa of 2.5 or less can remain in the film. That is, the proton donating compound having a pKa of 2.5 or less as a plasticizer is unlikely to leak from the proton conducting film of the present disclosure.

In addition, as described above, due to the ionic interaction, the plasticizer is more likely to "penetrate" into the second part. The inventors of the present disclosure conducted extensive studies and found that, by simply bringing the polymer and the plasticizer according to the present disclosure into contact with each other, the plasticizer spontaneously penetrates into the polymer, and a uniform mixed phase is formed. Here, in the proton conducting film of the present disclosure, even if the polymer and the plasticizer are present together, the plasticizer mainly penetrates into the second part of the polymer, and the state of the domain of the first part of the polymer is maintained.

In addition, when this "penetration" progresses, that is, a large amount of the plasticizer penetrates into the second part, the glass transition temperature of the polymer is lowered compared to when no plasticizer is included. When the glass transition temperature of the polymer is lowered, segment movement of polymer chains is also activated, and high proton conductivity can be imparted to the proton conducting film of the present disclosure.

Here, in FIG. 1, the proton donating compound is shown as a proton donating dibasic acid, and the present disclosure is not limited thereto.

In the present disclosure, a polymer having a first part and a second part which are connected by a covalent bond may be, for example, a block copolymer.

In consideration of variation diversity and ease of handling, the polymer having a first part and a second part which are connected by a covalent bond is preferably a block copolymer. Hereinafter, the proton conducting film of the present disclosure will be described using a case in which the polymer having a first part and a second part which are connected by a covalent bond is a block copolymer as an example.

In the present disclosure, when the polymer having a first part and a second part which are connected by a covalent bond is a block copolymer, the first part and the second part may be a block A and a block B of the block copolymer, respectively. Therefore, in the following description, the "block copolymer" corresponds to a "polymer having a first part and a second part", the "block A" corresponds to a "first part" and the "block B" corresponds to a "second part."

<Block Copolymer>

The block copolymer may include a block A and a block B.

(Block A)

In the present disclosure, blocks A aggregate with each other to form a domain at an operation temperature of the proton conducting film.

In other words, blocks A are not particularly limited as long as they can aggregate with each other to form a domain at an operation temperature of the proton conducting film. Therefore, examples of blocks A include polystyrene-based polymers, polyacrylic ester-based polymers, polymethacrylate ester-based polymers, polyolefin-based polymers, polysulfone-based polymers, polyarylate-based polymers, polyether ketone-based polymers, polyether imide-based polymers, polyphenylene sulfide-based polymers, polyphenylene ether-based polymers, polycarbonate-based polymers, polybenzimidazole-based polymers, and polyfluoroethylene-based polymers, but the present disclosure is not limited thereto.

The polystyrene-based polymer refers to a polymer having 50 mol % or more of a styrene moiety as a repeating unit, and examples thereof include polystyrene, polyacetylstyrene, polyanisoylstyrene, polybenzoylstyrene, polybiphenylstyrene, polybromoethoxystyrene, polybromomethoxystyrene, polybromostyrene, polybutoxymethylstyrene, polytert-butylstyrene, polybutyrylstyrene, polychlorofluorostyrene, polychloromethylstyrene, polychlorostyrene, polycyanostyrene, polydichlorostyrene, polydifluorostyrene, polydimethylstyrene, polyethoxymethylstyrene, polyethoxystyrene, polyfluoromethylstyrene, polyfluorostyrene, polyiodostyrene, polymethoxycarbonylstyrene, polymethoxymethylstyrene, polymethylstyrene, polymethoxystyrene, polyperfluorostyrene, polyphenoxystyrene, polyphenylacetylstyrene, polyphenylstyrene, polypropoxystyrene, polytoluoylstyrene and polytrimethylstyrene, but the present disclosure is not limited thereto.

The polyacrylic ester-based polymer refers to a polymer having 50 mol % or more of an acrylic ester moiety as a repeating unit, and examples thereof include adamantyl polyacrylate, tert-butyl polyacrylate, tert-butylphenyl polyacrylate, cyanoheptyl polyacrylate, cyanohexyl polyacrylate, cyanomethyl polyacrylate, cyanophenyl polyacrylate, fluoromethyl polyacrylate, methoxycarbonylphenyl polymethacrylate, methoxyphenyl polyacrylate, naphthyl polyacrylate, pentachlorophenyl polyacrylate, and phenyl polyacrylate, but the present disclosure is not limited thereto.

The polymethacrylate ester-based polymer refers to a polymer having 50 mol % or more of a methacrylic ester moiety as a repeating unit, and examples thereof include polymethyl methacrylate, polyethyl methacrylate, polymethacrylonitrile, polyadamantyl methacrylate, polybenzyl methacrylate, poly-tert-butyl methacrylate, tert-butyl-phenyl polymethacrylate, cycloethyl polymethacrylate, cyanoethyl polymethacrylate, cyanomethylphenyl polymethacrylate, cyanophenyl polymethacrylate, cyclobutyl polymethacrylate, cyclodecyl polymethacrylate, cyclododecyl polymethacrylate, polycyclobutyl methacrylate, polycyclohexyl methacrylate, polycyclooctyl methacrylate, polyfluoroalkyl methacrylate, polyglycidyl methacrylate, polyisobornyl methacrylate, polyisobutyl methacrylate, polyphenyl methacrylate, polytrimethylsilyl methacrylate, and polyxylenyl methacrylate, but the present disclosure is not limited thereto.

The polyolefin-based polymer refers to a polymer having 50 mol % or more of an olefin moiety as a repeating unit, and examples thereof include polyethylene, polypropylene and poly α-olefin, but the present disclosure is not limited thereto.

The polysulfone-based polymer refers to a polymer having 50 mol % or more of a sulfone moiety as a repeating unit, and examples thereof include polyphenyl sulfone, polyether sulfone, and polysulfone, but the present disclosure is not limited thereto.

The polyarylate-based polymer refers to a polymer having 50 mol % or more of an arylate moiety as a repeating unit, and examples thereof include polyarylate, but the present disclosure is not limited thereto.

The polyether ketone-based polymer refers to a polymer having 50 mol % or more of an ether ketone moiety as a repeating unit, and examples thereof include polyether ketone, polyetherether ketone, polyether ketone, and polyetherether ketone, but the present disclosure is not limited thereto.

The polyether imide-based polymer refers to a polymer having 50 mol % or more of an ether imide moiety as a repeating unit, and examples thereof include polyether imide, but the present disclosure is not limited thereto.

The polyphenylene sulfide-based polymer refers to a polymer having 50 mol % or more of a phenylene sulfide moiety as a repeating unit, and examples thereof include polyphenylene sulfide, but the present disclosure is not limited thereto.

The polyphenylene ether-based polymer refers to a polymer having 50 mol % or more of a phenylene ether moiety as a repeating unit, and examples thereof include polyphenylene ether, but the present disclosure is not limited thereto.

The polycarbonate-based polymer refers to a polymer having 50 mol % or more of a carbonate moiety as a repeating unit, and examples thereof include polycarbonate, but the present disclosure is not limited thereto.

The polybenzimidazole-based polymer refers to a polymer having 50 mol % or more of a benzimidazole moiety as a repeating unit, and examples thereof include polybenzimidazole, but the present disclosure is not limited thereto.

The polyfluoroethylene-based polymer refers to a polymer having 50 mol % or more of a fluoroethylene moiety as a repeating unit, and examples thereof include polytetrafluoroethylene, polychlorotrifluoroethylene, and polyvinylidene fluoride, but the present disclosure is not limited thereto.

Here, in the present disclosure, the prefix "poly" refers to a polymer including two or more monomers.

Among the above examples, according to an operation temperature of the proton conducting film, that having a glass transition temperature or melting temperature higher than the operation temperature of the proton conducting film can be selected as the block A. In addition, for example, in consideration of low miscibility with a plasticizer containing a proton donating compound, ease of handling, low cost, and the like, the block A is preferably a polystyrene-based polymer.

(Block B)

In the present disclosure, the block B has a proton accepting group. Therefore, the block B is not particularly limited as long as it has a proton accepting group.

The proton accepting group may be a nitrogen-containing heterocyclic group. The nitrogen-containing heterocyclic group may be, for example, a pyridine ring group, an imidazole ring group, a pyrazole ring group, an imidazoline ring group, an oxazole ring group, a pyrimidine ring group, a pyrazine ring group, a triazole ring group or a tetrazole ring group. The nitrogen-containing heterocyclic group is preferably a nitrogen-containing heteroaromatic ring group and particularly preferably a pyridine ring group or an imidazole ring group.

An amount of proton accepting groups (number of moles) per 1 g of the block B is not particularly limited, and may be, for example, 0.1 mmol/g or more, 0.5 mmol/g or more, 1.0 mmol/g or more, 2.5 mmol/g or more, or 5.0 mmol/g or more. In addition, in order to facilitate synthesis of the block B and secure handling properties of the obtained polymer, the amount of proton accepting groups (number of moles) per 1 g of the block B may be, for example, 50 mmol/g or less, 40 mmol/g or less, 30 mmol/g or less, or 25 mmol/g or less.

The repeating unit constituting the block B is not particularly limited, and it may be derived from, for example, a vinyl monomer, an ether monomer, an ester monomer, an amide monomer, or a silicone monomer. Among these, since it is easy to obtain monomers and molecular modification is easy therewith, those derived from a vinyl monomer are preferable.

Examples of polymers that can form the block B are shown as follows, but the present disclosure is not limited thereto.

Vinyl polymers having a pyridine ring: poly(2-vinyl pyridine) and poly(4-vinylpyridine), etc.

Vinyl polymers having an imidazole ring: poly(1-vinylimidazole), poly(2-methyl-1-vinylimidazole), poly(2-vinylimidazole), poly(4-vinylimidazole), poly(2-phenyl-1-vinylimidazole), poly(1-vinylcarbazole), and poly(2-(1H-imidazol-1-yl)ethyl (meth)acrylate), etc.

Vinyl polymers having a pyrazole ring: poly(1-vinylpyrazole) or poly(3-vinylpyrazole), etc.

Vinyl polymers having an imidazoline ring: poly(1-vinyl-2-imidazoline), poly(1-vinyl-2-methylimidazoline), poly(2-vinyl-2-imidazoline), and poly(2-(1H-imidazoline-1-yl)ethyl (meth)acrylate), etc.

Vinyl polymers having an oxazole ring: poly(2-phenyl-5-vinyloxazole), etc.

Vinyl polymers having a pyrimidine ring: poly(5-vinylpyrimidine) and poly(2,4-dichloro-6-vinylpyrimidine), etc.

Vinyl polymers having a pyrazine ring: poly(2-vinylpyrazine), poly(2,5-dimethyl-3-vinylpyrazine) and poly(2-methyl-5-vinylpyrazine), etc.

Vinyl polymers having a triazole ring: poly(2,4-diamino-6-vinyltriazine), etc.

Vinyl polymers having a tetrazole ring: poly(1-vinyl-1H-tetrazole), poly(2-vinyl-2H-tetrazole), poly(5-vinyl-1H-tetrazole), and poly(1-methyl-5-vinyl-1H-tetrazole), etc.

Among these examples, poly(2-vinylpyridine), poly(4-vinylpyridine) or poly(1-vinylimidazole) is more preferable.

Here, in this specification, "(meth)acrylic acid" refers to both acrylic acid and methacrylic acid. "(Meth)acrylate," "(meth)acrylamide," and the like should be similarly understood.

In the block B, since it is possible to secure higher proton conductivity and it is possible to further reduce leakage of the plasticizer due to the ionic interaction therewith, a proportion of proton accepting groups is preferably 10 mol % or more of repeating units constituting the block B.

In addition, the abundance proportion of proton accepting groups may be 15 mol % or more, 20 mol % or more, 30 mol % or more, 40 mol % or more, 50 mol % or more, 60 mol % or more, 70 mol % or more, 80 mol % or more, 90 mol % or more, 95 mol % or more, 96 mol % or more, or 97 mol % or more. In addition, the abundance proportion may be 99.5 mol % or less, 99 mol % or less, 98 mol % or less, 95 mol % or less, 90 mol % or less, 80 mol % or less, 70 mol % or less, 60 mol % or less, 50 mol % or less, 40 mol % or less, or 35 mol % or less.

The block B is combined with a plasticizer to be described below to form a proton conducting film and thereby provide a high molecular mobility. Therefore, the glass transition temperature Tg of the block B alone may be relatively high. However, when the glass transition temperature of the block B is excessively high, the molecular mobility may not be sufficiently improved even if it is mixed with the plasticizer.

Therefore, the glass transition temperature of the block B may be 400° C. or lower, 350° C. or lower, 300° C. or lower, or 250° C. or lower. The block B may have two or more glass transition temperatures. When the block B is mixed with a plasticizer, the mixture has a low glass transition temperature, and accordingly, the block B can maintain high molecular mobility when the obtained proton conducting film is used. In addition, high proton conductivity can be realized according to the presence of free protons.

(Arrangement of Block Copolymers)

The arrangement of block copolymers composed of blocks A and blocks B is not particularly limited, and may be, for example, a diblock copolymer such as "AA . . . AABB . . . BB" (also referred to as "A-B type"), a triblock copolymer such as "AA . . . AABB . . . BBAA . . . AA" (also referred to as "A-B-A type"), or a triblock copolymer such as "BB . . . BBAA . . . AABB . . . BB" (also referred to as "A-B-A type").

In order to exhibit effects of the present disclosure, the block copolymer is preferably a A-B-A type triblock copolymer composed of blocks A and a block B.

An example of the A-B-A type triblock copolymer is shown in the following Formula 1.

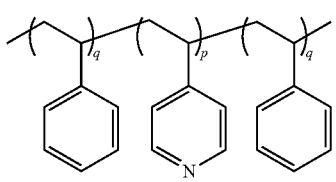

Formula 1

In the formula, p represents an integer of 2 or more, and may be, for example, 2 or more, 10 or more, 30 or more, 50 or more, 100 or more, 200 or more, 500 or more, 800 or more, 1,000 or more, 1,500 or more, or 2,000 or more, and may be 20,000 or less, 15,000 or less, 10,000 or less, 8,000 or less, 5,000 or less, or 4,000. In addition, q represents an integer of 1 or more, and may be, for example, 1 or more, 5 or more, 15 or more, 25 or more, 50 or more, or 75 or more, and may be 1,000 or less, 500 or less, 400 or less, 250 or less, or 150 or less.

In addition, as long as effects of the present disclosure are not impaired, the block copolymer may further include other monomers or polymers different from the block A and the block B, and may further include residues such as an initiator, a coupling agent, a chain transfer agent or the like used when the block copolymer is produced.

An example in which a block copolymer further includes residues of a chain transfer agent is shown in the following Formula 2.

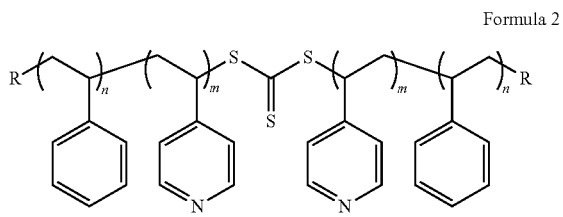

Formula 2

In the formula, m represents an integer of 1 or more, and may be, for example, 1 or more, 5 or more, 15 or more, 25 or more, 50 or more, 100 or more, 250 or more, 400 or more, 500 or more, 750 or more, or 1,000 or more, and may be 10,000 or less, 7,500 or less, 5,000 or less, 4,000 or less, 2,500 or less, or 2,000. In addition, n represents an integer of 1 or more, and may be, for example, 1 or more, 5 or more, 15 or more, 25 or more, 50 or more, or 75 or more, and may be 1,000 or less, 500 or less, 400 or less, 250 or less, or 150 or less. In addition, —R and —S—C(S)—S— are residues of a chain transfer agent.

(Synthesis of Block Copolymer)

A method of synthesizing a block copolymer including a block A and a block B is not particularly limited. For example, the following method can be used, but the present disclosure is not limited thereto.

That is, in the presence of a small amount of polymerization initiator, a RAFT agent (reversible non-cleavable chain transfer agent) and monomers constituting the block A (or the block B) are polymerized and then isolated and purified to synthesize a macro RAFT agent including the block A (or the block B). Then, the macro RAFT agent and monomers constituting the block B (or the block A) are polymerized in the presence of a small amount of polymerization initiator, and thereby a block copolymer including the block A and the block B can be synthesized.

Examples of polymerization initiators include azo-based radical polymerization initiators such as azobisisobutyronitrile (AIBN), 2,2'-azobis(4-methoxy-2,4-dimethylvaleronitrile), 2,2'-azobis(2-cyclopropylpropionitrile), 2,2'-azobis(2,4-dimethylvaleronitrile), and dimethyl 2,2'-azobisisobutyrate, and peroxide-based radical polymerization initiators such as benzoyl peroxide, t-butyl hydroperoxide, and cumene hydroperoxide, but the present disclosure is not limited thereto.

Examples of RAFT agents include thiocarbonylthio compounds such as dithioesters, dithiocarbamates, trithiocarbonates, and xanthates. In addition, specific examples of RAFT agents include bis(n-octylmercapto-thiocarbonyl)disulfide, 4-cyano-4-[(dodecylsulfanylthiocarbonyl)sulfanyl]pentanoic acid, 2-(dodecylthiocarbonylthiothio)-2-methylpropionic acid, S,S'-bis($\alpha,\alpha'$-dimethyl-$\alpha''$-acetic acid) trithiocarbonate, 2-cyano-2-propyldodecyl trithiocarbonate, 4-cyano-4-(phenylcarbonylthiothio)pentanoic acid, cyanomethyldodecyl trithiocarbonate and 2-cyano-2-propylbenzodithionate, but the present disclosure is not limited thereto.

In addition, when a RAFT agent is appropriately selected, a desired block copolymer arrangement can be synthesized. For example, when a RAFT agent such as dithioester or dithiocarbamate is used, an A-B type diblock copolymer can be synthesized. In addition, when a RAFT agent such as trithiocarbonate is used, an A-B-A type or B-A-B type triblock copolymer can be synthesized.

The average degree of polymerization of the block A is not particularly limited, and may be, for example, 2 or more, 10 or more, 30 or more, 50 or more, 100 or more, or 150 or more, and may be 2,000 or less, 1,000 or less, 800 or less, 500 or less, or 300 or less. When the average degree of polymerization of the block A is 2 or more, at an operation temperature of the proton conducting film, blocks A aggregate with each other and easily form a domain. In addition, when the average degree of polymerization of the block A is 10,000 or less, handling as a sample becomes easy. Here, for example, in the case of the A-B-A type triblock copolymer, the "average degree of polymerization of the block A" is a value of a total average degree of polymerization of components of the block A contained.

The average degree of polymerization of the block B is not particularly limited, and may be, for example, 2 or more, 10 or more, 30 or more, 50 or more, 100 or more, 200 or more, 500 or more, 800 or more, 1,000 or more, 1,500 or more, or 2,000 or more, and may be 20,000 or less, 15,000 or less, 10,000 or less, 8,000 or less, 5,000 or less, or 4,000. When the average degree of polymerization of the block B is 2 or more, mixing with a plasticizer is performed and a uniform mixed phase is easily formed. In addition, when the average degree of polymerization of the block B is 20,000 or less, the acidity or basicity of the proton conducting film is easily adjusted.

Here, in the present disclosure, the average degree of polymerization can be determined according to an $^1$H-NMR method.

<Plasticizer>

The plasticizer contained in the proton conducting film of the present disclosure contains a proton donating compound having a pKa of 2.5 or less, a pKa of 2.3 or less, a pKa of 2.1 or less, a pKa of 2.0 or less, a pKa of 1.0 or less, a pKa of 0.0 or less, a pKa of −1.0 or less, or a pKa of −2.0 or less. Therefore, the plasticizer contains a proton donating compound having high acidity, that is, a compound which is highly likely to release protons.

Here, in the present disclosure, pKa is an acid dissociation constant in water at 25° C. and a value pKai in the first-stage dissociation is used for a compound which undergoes multi-stage dissociation such as sulfuric acid or phosphoric acid. For example, the pKa of sulfuric acid is −3.0, and the pKa of phosphoric acid is 1.83 (reference: "Chemical Handbook," Revised 5th edition, The Chemical Society of Japan, pp. II-332-333, "Evans group pKa table, Harvard University").

The proton donating compound may be an sulfuric acid, phosphoric acid, or ethanedisulfonic acid, or an organic acid such as 4-hydroxybenzene-1,3-bis(sulfonic acid). Among these, the proton donating compound is preferably at least one selected from among sulfuric acid and phosphoric acid.

The proton donating compound preferably has a high boiling point or decomposition temperature to an extent that volatilizing and evaporation or decomposing does not occur at an operation temperature of the proton conducting film. In this regard, the boiling point or decomposition temperature of the proton donating compound may be, for example, higher than 120° C., 150° C. or higher, or 200° C. or higher.

The proton donating compound may be at least one selected from among sulfuric acid and phosphoric acid, and may be sulfuric acid or phosphoric acid. Here, the boiling point of sulfuric acid is about 290° C. (decomposition), and the boiling point of phosphoric acid is about 213° C. (decomposition).

The plasticizer may be composed of only a proton donating compound or may be composed of a proton donating compound and another plasticizer. Another plasticizer may be a plasticizer having no proton donating property, and specific examples thereof include a polyalkylene glycol, polyvinyl ether, and polyol ester. A use proportion of the other plasticizer may be, for example, 50 parts by mass or less, 30 parts by mass or less, 10 parts by mass or less, 5 parts by mass or less, or 1 part by mass or less, with respect to a total mass of 100 parts by mass of the plasticizer, or another plasticizer may not be used at all.

Here, in this specification, the "alkylene group" is a concept including a methylene group, an alkylmethylene group, and a dialkylmethylene group.

(Molar Ratio of Proton Donating Compound to Proton Accepting Groups)

The molar ratio (proton donating compound/proton accepting group) of the proton donating compound to the proton accepting groups is not particularly limited, and it may be, for example, 1.0 or more, 1.1 or more, 1.3 or more, 1.4 or more, 1.5 or more, 1.6 or more, 1.7 or more, 1.8 or more, 1.9 or more, 2.0 or more, 2.1 or more, 2.2 or more, 2.3 or more, 2.4 or more, 2.5 or more, 2.6 or more, 2.7 or more, 2.8 or more, 2.9 or more, 3.0 or more, 3.1 or more, 3.4 or more, 3.5 or more, 3.6 or more, 3.7 or more, 3.8 or more, 3.9 or more, 4.0 or more, 4.1 or more, 4.2 or more, or 4.3 or more, in order for the proton donating compound to secure a function as a plasticizer. In addition, the upper limit of the molar ratio is not particularly limited, and it may be, for example, 10.0 or less, 9.0 or less, 8.5 or less, 8.0 or less, 7.5 or less, 7.0 or less, 6.5 or less, 6.0 or less, 5.5 or less, 5.0 or less, 4.5 or less, 4.4 or less, or 4.3 or less, in order to maintain the film strength and secure stability for a film.

<Proportions of Block Copolymer and Plasticizer>

Regarding use proportions of the block copolymer and the plasticizer, in order to increase molecular mobility of the obtained proton conducting film and obtain sufficiently high proton conductivity, a use proportion of the plasticizer with respect to a total of 100 parts by mass of the block copolymer and the plasticizer may be 50 parts by mass or more, 60 parts by mass or more, 65 parts by mass or more, 70 parts by mass or more, 75 parts by mass or more, or 80 parts by mass or more. On the other hand, in order to maintain the film strength and secure stability for a film, a use proportion of the plasticizer with respect to a total of 100 parts by mass of the block copolymer and the plasticizer may be 90 parts by mass or less, 85 parts by mass or less, 82 parts by mass or less, 80 parts by mass or less, 75 parts by mass or less, 70 parts by mass or less, or 65 parts by mass or less.

In addition, in the present disclosure, a total number of moles of protons that can be donated from the proton donating compound having a pKa of 2.5 or less contained in the plasticizer is preferably larger than a total number of moles of protons that can be accepted by the above proton accepting group.

<Properties of Proton Conducting Film>
(Form)

The proton conducting film of the present disclosure is preferably a viscoelastic solid in a temperature range of 50° C. or higher and 100° C. or lower.

Here, the "viscoelastic solid" is a solid having viscosity and elasticity and refers to a solid exhibiting no fluidity and maintaining its shape. More specifically, the "viscoelastic solid" substance has properties in which, when stress is applied and small deformation is caused, stress with respect to deformation is maximized immediately after deformation, and decreases with the passage of time, and becomes finally a certain value which is not zero, and when stress that has caused deformation in that state is removed, the deformation is reduced and in some cases, the original shape is restored.

It is thought that, in the proton conducting film of the present disclosure, the proton donating compound as a plasticizer donates protons for anionization and the proton accepting group of the block B receives protons for cationization, and the proton donating compound as a plasticizer remains on the proton conducting film due to an electrostatic interaction therebetween, and thereby, a viscoelastic solid state of the proton conducting film as a whole can be maintained. It is thought that molecular motion in the proton conducting film is promoted according to characteristic mechanical characteristics (flexibility) of such a viscoelastic solid, and accordingly, the proton conductivity is promoted.

(Film Thickness)

Since the proton conducting film of the present disclosure has excellent molding processability and can be formed by a hot melt method or a solvent casting method, it can be thinner than a proton conducting film of the related art.

Therefore, the film thickness of the proton conducting film of the present disclosure can be, for example, 1.00 mm or less, 0.90 mm or less, 0.80 mm or less, 0.75 mm or less, 0.73 mm or less, 0.72 mm or less, 0.71 mm or less, 0.70 mm or less, 0.68 mm or less, 0.65 mm or less, 0.60 mm or less, 0.55 mm or less, 0.50 mm or less, 0.45 mm or less, 0.40 mm or less, 0.35 mm or less, 0.30 mm or less, 0.28 mm or less, 0.25 mm or less, 0.23 mm or less, or 0.20 mm or less. In addition, the film thickness may be, for example, 0.05 mm or more or 0.10 or more.

(Glass Transition Temperature)

The proton conducting film of the present disclosure includes a block copolymer and a plasticizer and thus exhibits high molecular mobility in the entire film. High molecular mobility of the proton conducting film can be evaluated according to the low glass transition temperature Tg.

Since the molecular mobility of the plasticizer itself introduced is high and the glass transition temperature Tg of the mixture including the second part and the plasticizer is low, the proton conducting film of the present disclosure can maintain molecular mobility at low temperatures and thereby high proton conductivity can be obtained. The glass transition temperature Tg of the proton conducting film is preferably a lower limit value of the operation temperature of the proton conducting film or lower, and may be, for example, lower than room temperature, lower than 5° C., 2° C. or lower, 0° C. or lower, −20° C. or lower, −40° C. or lower, −60° C. or lower, −65° C. or lower, −70° C. or lower, −75° C. or lower, −80° C. or lower, −84° C. or lower, −85° C. or lower, or lower than −85° C.

Here, the glass transition temperature Tg in this specification is a value obtained according to JIS K7121:2012 based on a DSC curve obtained by measurement at a rate of temperature increase of 10° C./min.

(Proton Conductivity)

The proton conducting film of the present disclosure exhibits high proton conductivity in a low humidity or anhydrous environment. The proton conductivity of the proton conducting film of the present disclosure may be 3 mS/cm or more in a low humidity or anhydrous environment at 50° C. The value may be, for example, 3.2 mS/cm or more, 5.0 mS/cm or more, 10 mS/cm or more, 14 mS/cm or more, 15 mS/cm or more, 30 mS/cm or more, 40 mS/cm or more, 50 mS/cm or more, 75 mS/cm or more, 80 mS/cm or more, 90 mS/cm or more, or 95 mS/cm or more. In addition, the proton conductivity of the proton conducting film of the present disclosure may be, for example, 19 mS/cm or more, 20 mS/cm or more, 30 mS/cm or more, 50 mS/cm or more, 75 mS/cm or more, 100 mS/cm or more, 125 mS/cm or more, 150 mS/cm or more, 175 mS/cm or more, or 200 mS/cm or more, in a low humidity or anhydrous environment at 120° C.

(Water Content)

The proton conducting film of the present disclosure exhibits high proton conductivity even if the film does not contain water. Therefore, the water content of the proton conducting film may be, for example, 1 part by mass or less, 0.1 parts by mass or less, 0.01 parts by mass or less, or 0.001 parts by mass or less based on a total mass of 100 parts by mass of the film.

<Production of Proton Conducting Film>

For example, the proton conducting film of the present disclosure can be produced by introducing a plasticizer into a block copolymer. Introduction of the plasticizer into the block copolymer is not particularly limited, and can be performed according to, for example, the following Processes (i) to (iv).

(i) Dissolving or dispersing a block copolymer in a solvent to prepare a block copolymer solution or dispersion solution. Here, the solvent used is preferably a solvent that relatively easily evaporates (that is, a volatile solvent). Examples of solvents include an alcohol solvent such as methanol and ethanol, an ether solvent such as dimethyl ether, diethyl ether, and tetrahydrofuran, an ester solvent such as ethyl acetate, a pyridine solvent such as pyridine, water, and solvent mixtures thereof, but the present disclosure is not limited thereto.

(ii) Removing the solvent for the block copolymer solution or dispersion solution obtained in Process (i) to form a block copolymer film. Here, a method of removing a solvent is not particularly limited, and, for example, evaporation at room temperature or by heating may be performed. In addition, an operation such as drying may be appropriately added.

(iii) Dissolving or dispersing a plasticizer in a solvent to prepare a plasticizer solution or dispersion solution. Here, the solvent used may be selected from among polar solvents that have high affinity to the block copolymer and the plasticizer and are stable with respect to a strong acid, and a solvent that relatively easily evaporates is preferable. Examples of solvents include an alcohol solvent such as methanol and ethanol and an ether solvent such as dimethyl ether, diethyl ether and tetrahydrofuran, but the present disclosure is not limited thereto. In addition, here, an amount of the solvent used may be, for example, 500 parts by mass or more, 750 parts by mass or more, 1,000 parts by mass or more, 1,250 parts by mass or more, or 1,500 parts by mass or more and may be, for example, 5,000 parts by mass or less, 4,500 parts by mass or less, 4,000 parts by mass or less, 3,500 parts by mass or less, or 3,000 parts by mass or less, with respect to a total of 100 parts by mass of the plasticizer and the block copolymer film obtained in Process (ii).

(iv) Immersing the block copolymer film obtained in Process (ii) in the plasticizer solution or dispersion solution prepared in Process (iii) to remove the solvent, thereby obtaining a proton conducting film of the present disclosure. Here, a method of removing a solvent is not particularly limited, and, for example, evaporation at room temperature or by heating may be performed. In addition, an operation such as drying may be appropriately added.

Molding of the proton conducting film into a film shape can be appropriately performed by a method, for example, a cast method or a press method, before the solvent is removed in the above Process (iv). Alternatively, molding can be performed by a method such as a hot melt method after the above Process (iv).

<Fuel Cell>

A fuel cell of the present disclosure includes a proton conducting film of the present disclosure. In particular, the fuel cell of the present disclosure has a laminate in which a fuel electrode side separator having a fuel flow path, a fuel electrode side catalyst layer, a proton conducting film of the present disclosure, an air electrode side catalyst layer, and an air electrode side separator having an air flow path are laminated in that order. In addition, in particular, the fuel cell of the present disclosure has a laminate in which a fuel electrode side separator having a fuel flow path, a fuel electrode side gas diffusion layer, a fuel electrode side catalyst layer, a proton conducting film of the present disclosure, an air electrode side catalyst layer, an air electrode side gas diffusion layer, and an air electrode side separator having an air flow path are laminated in that order.

The present disclosure will be described below in detail with reference to examples. The following examples do not limit applications of the present disclosure.

EXAMPLE 1

<Production of Proton Conducting Film of Example 1>

In Example 1, according to the following scheme 1, as an ABA triblock copolymer, polystyrene-b-poly(4-vinylpyridine)-b-polystyrene (hereinafter referred to as an "SPS triblock copolymer") was synthesized (first and second processes), and the SPS triblock copolymer film (simply referred to as an "SPS film") was produced (third process). Then, the produced SPS film was swollen in sulfuric acid ($H_2SO_4$) to prepare a proton conducting film of Example 1 (fourth process). Here, in the term "SPS," "S" at both ends is an abbreviation of polystyrene, and "S" has no proton accepting group and they aggregate with each other to form a glass state domain at an operation temperature of the proton conducting film, that is, a "block A" in the present disclosure. In addition, "P" at the center is an abbreviation of poly(4-vinylpyridine) and is a polymer having a proton accepting group, that is, a "block B" in the present disclosure.

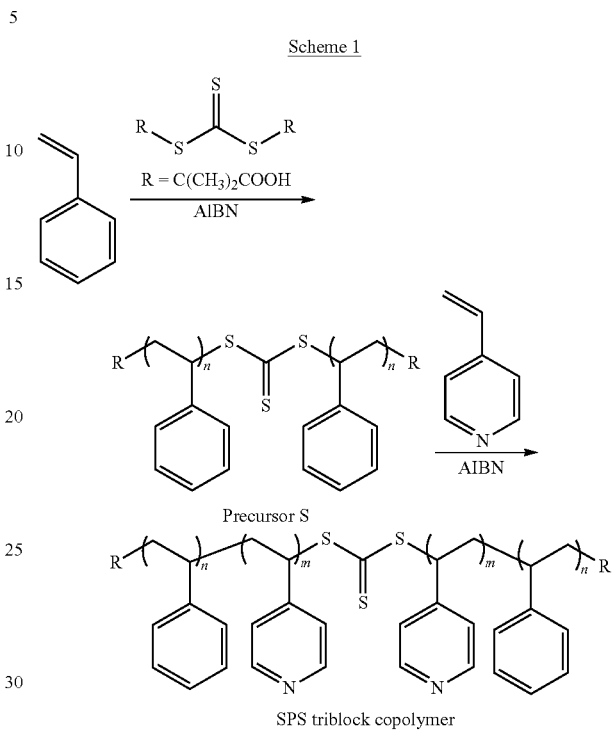

Scheme 1

(1) First Process

Unpurified styrene monomers were caused to pass through a column filled with basic alumina and thereby the styrene monomers were purified. 13.6 g (0.131 mol) of the purified styrene monomers, 94 mg (0.333 mmol) of an RAFT agent, and 5.0 mg (0.030 mmol) of azobisisobutyronitrile (AIBN) were weighed out, and mixed in a round bottom flask with a cock to prepare a solution. Then, bubbling was caused with nitrogen gas for 10 minutes, and polymerization was caused while stirring at 130° C. and 500 rpm using an oil bath at an atmospheric pressure. After 6 hours, the flask was immersed in liquid nitrogen and thereby the polymerization reaction was completely stopped.

Here, regarding the RAFT agent, S,S'-bis(α,α'-dimethyl-α"-acetic acid)trithio carbonate was used. In addition, a molar ratio between the styrene monomers and the RAFT agent was about 390:1.

Next, tetrahydrofuran (THF) was added to the reaction system to prepare about 8 mass % of a polymer solution. This polymer solution was added dropwise into about 500 mL of methanol to precipitate a powdered polymer (crude polystyrene). The obtained polymer was separated by suction filtration and sufficiently dried by vacuum drying, and then dissolved in THF again, and added dropwise into methanol to precipitate the polymer. The operation of precipitating a polymer was performed three times in total, unreacted monomers and low-molecular-weight oligomers were removed, and thereby a purified polystyrene was obtained.

The purified polystyrene was dissolved in heavy chloroform to prepare about 2 mass % of a solution, and the average degree of polymerization was determined by a proton nuclear magnetic resonance spectroscopic ($^1$H-

NMR) method. The average degree of polymerization was 187, and the average molecular weight was about 20,000.

In addition, the purified polystyrene was dissolved in THF to prepare about 0.1 mass % of a solution, and the molecular weight distribution (Mw/Mn) was determined through gel permeation chromatography (GPC). A standard polystyrene was used for molecular weight calibration. The result was Mw/Mn=1.17. Here, measurement was performed when the effluent was THF, the flow rate was 1 mL/min, and three TSK-GEL columns 4000HHR (commercially available from Tosoh Corporation) were connected.

(2) Second Process

Since an RAFT agent was introduced into the central part of the purified polystyrene obtained in the above first process, polymerization with 4-vinylpyridine monomers was performed using this as a macro RAFT agent (it is called a "macro RAFT agent" because it is an RAFT agent having a large molecular weight).

More specifically, 4-vinylpyridine monomers were purified by passing them through basic alumina. 39.6 g (0.377 mol) of the purified 4-vinylpyridine monomers, 371 mg (0.0186 mmol) of the macro RAFT agent, and 9.6 mg (0.0585 mmol) of AIBN were weighed out, and mixed in a round bottom flask with a cock to prepare a solution. Then, bubbling was caused with nitrogen gas for 10 minutes, and polymerization was caused while stirring at 80° C. and 500 rpm using an oil bath at an atmospheric pressure. After about 1 hour, the flask was immersed in liquid nitrogen and thereby the polymerization reaction was completely stopped.

Here, a molar ratio between the 4-vinylpyridine monomers and the macro RAFT agent was about 20,000:1.

Next, chloroform was added to the reaction system solution to prepare about 5 mass % of a polymer solution. The polymer solution was added dropwise into about 1,000 mL of hexane to precipitate a powdered crude SPS triblock copolymer. The obtained polymer was separated by suction filtration and sufficiently dried by vacuum drying and then dissolved in chloroform again and added dropwise into hexane to precipitate a polymer. The operation of precipitating a polymer was performed three times in total, unreacted monomers and low-molecular-weight oligomers were removed, and thereby a purified SPS triblock copolymer was obtained. Here, the purified SPS triblock copolymer of Example 1 was abbreviated as "SPS-1."

SPS-1 was dissolved in heavy chloroform to prepare about 2 mass % of a solution, and the average degree of polymerization was determined according to the $^1$H-NMR method. The average degree of polymerization of the total of block A components was 187, and the average degree of polymerization of block B component chains was 3,370.

In addition, SPS-1 was dissolved in dimethylformamide (DMF) to prepare about 0.5 mass % of a solution, and Mw/Mn was determined through GPC, and the result was Mw/Mn=1.92. Here, measurement was performed when the effluent was DMF, the flow rate was 1 mL/min, and three TSK-GEL columns 4000HHR (commercially available from Tosoh Corporation) were connected.

(3) Third Process

About 1 g of SPS-1 obtained above was dissolved in about 10 g of a pyridine solvent. This solution was poured into a polymethylpentene petri dish (with an inner diameter of 8.5 cm) and left at 50° C. for about 2 days, and thus a volatile solvent (pyridine) was evaporated. Then, drying was performed using a vacuum dryer at 50° C. for about 1 day, the volatile solvent was completely removed, and thereby an SPS film was obtained. The thickness of the obtained film was about 0.12 mm.

(4) Fourth Process

A solution in which 554 mg of concentrated sulfuric acid (98%) was dissolved in 5.78 g of methanol was poured into a Teflon (registered trademark) container (with an inner diameter of 4 cm), 136 mg of the SPS film was immersed in this solution, and left at 50° C. for about 2 days, and thus a volatile solvent (methanol) was evaporated. Then, drying was performed using a vacuum dryer at 50° C. for about 1 day, the volatile solvent was completely removed, and 670 mg of a sample in which SPS was swollen in $H_2SO_4$ was obtained. The weight concentration of $H_2SO_4$ was 80 mass %, and a molar ratio of sulfuric acid to pyridyl groups (that is, pyridine ring groups) was 4.4.

The film thickness of the proton conducting film of Example 1 obtained above was 0.71 mm. Since the proton conducting film of the present disclosure was not chemically crosslinked and was able to be dissolved in a solvent, it was possible to be relatively easily produced as a thin film by a solvent casting method, a spin coating method, a hot melt method, or the like.

In addition, in Example 1, the SPS film was uniformly swollen in sulfuric acid to produce a proton conducting film. Although the film thickness of the produced proton conducting film of Example 1 was larger than the film thickness of the SPS film (containing no sulfuric acid), if the SPS film itself was made thinner, it was swollen in sulfuric acid accordingly, and the film thickness of the produced proton conducting film could be adjusted to a desired thickness. Similarly, when the film area of the SPS film itself was made larger, the film area of the obtained proton conducting film could be larger. In other words, according to the present disclosure, it was possible to provide a thin and large-area proton conducting film.

In addition, in the sample of the proton conducting film of Example 1, it could be inferred that SPS formed a nanophase separation structure and in the structure, the block B crosslinked domains formed by blocks A. In addition, sulfuric acid had a functional group (sulfonic acid group) having a high ability to release protons, that is, was a proton donating compound having a pKa of 2.5 or less, and was contained as a non-volatile plasticizer in the proton conducting film. In addition, the pyridyl group of the block B was a functional group having a high proton coordination ability. In this case, it could be inferred that, since a total number of moles of protons that could be donated from sulfuric acid was larger than a total number of moles of protons that could be accepted by the pyridyl group, most of pyridyl groups of the block B received protons from sulfuric acid and generated pyridinium ions (cation). In addition, it could be inferred that most of the sulfuric acid became sulfate ions (anions) because protons were released therefrom.

<Evaluation>

(Measurement of Glass Transition Temperature)

The glass transition temperature of the sample of the proton conducting film of Example 1 obtained above was measured according to JISK7121:2012 under conditions of a rate of temperature increase of 10° C./min in a temperature range of −85° C. to 0° C. One glass transition temperature Tg was observed. The Tg was lower than −85° C., and was lower than an operation temperature of the proton conducting film (for example, a range of room temperature or higher and 150° C. or lower).

Here, in the proton conducting film of Example 1, Tg obtained by measurement was lower than a measurement temperature (50° C., 80° C., 95° C., 110° C., and 120° C.) in "Measurement of AC impedance" to be described below, and despite the fact that it was not chemically crosslinked, the shape of the film was maintained without flowing in measurement of AC impedance. This suggested that the block B crosslinked domains formed by blocks A in the structure.

The measurement results of the glass transition temperature of Example 1 are shown in the following Table 2.

(Leaving Test With No Load)

The sample of the proton conducting film of Example 1 obtained above was left for 1 hour in a non-load state while changing the temperature, and evaluated according to the following criteria. When neither a leaked material nor a volatile material was observed in a temperature range of −40° C. or higher and 150° C. or lower, this was evaluated as A. When a leaked material or a volatile material was confirmed at a temperature of 100° C. or higher, this was evaluated as B. When a leaked material or a volatile material was confirmed in a range of −40° C. or higher, this was evaluated as C.

The sample of the proton conducting film of Example 1 was subjected to a leakage test with no load, and no leaked material was observed in a temperature range of −40° C. or higher and 150° C. or lower, and the evaluation result was "A," and it was confirmed that the plasticizer did not leak in a battery operation temperature range. This was thought to be caused by the fact that the pyridyl group having a high proton coordination ability present in the block B became pyridinium ion (cations) due to protons released from sulfuric acid, and an ionic interaction was caused between the pyridinium ions (cations) and sulfate ions (anions) released from protons.

The measurement results of the test in which Example 1 was left with no load are shown in the following Table 2.

(Measurement of AC Impedance)

A platinum mesh with a thickness of 0.1 mm was used as an electrode, and the AC impedance of the sample of the proton conducting film of Example 1 was measured.

The sample of the proton conducting film of Example 1 cut into a strip shape (with a thickness of 0.71 mm, a width of 2.1 mm, and a length of 10 mm) was interposed between a pair of electrodes between which a distance was 0.70 cm and which were disposed to face each other. The sample interposed between the electrodes was placed in a natural convection constant-temperature dryer and dried under conditions of a temperature of 50° C. and a relative humidity (RH) of 7.8% for 1 hour or longer. Here, a professional temperature and moisture meter testo635-2 (commercially available from Testo SE & Co. KGaA) was used to measure the temperature and the relative humidity.

After waiting until the temperature in the dryer became 50° C., an AC impedance was measured using a potentiostat/galvanostat VERSASTAT4-400 (commercially available from Prinston Applied Research) with an FRA (frequency characteristic analysis) option at a voltage of 80 mV and a frequency that was changed from $10^6$ Hz in units of 1 Hz under non-humidified conditions. When the resistance value in the frequency domain in which the absolute value of the resistance value was almost constant was read, it was $4.7 \times 10^2$ Ω.

In addition, the proton conductivity of the sample of the proton conducting film obtained by the following Formula (1) was 99 mS/cm. This result indicated very high proton conductivity comparable to that of a humidified Nafion (registered trademark) film.

$$\text{Proton conductivity} = \text{distance between electrodes}/(\text{thickness of film} \times \text{width of film} \times \text{resistance value}) \quad (1)$$

Next, when an AC impedance was measured under measurement conditions of a temperature of 80° C. and a relative humidity (RH) of 2.9%, the resistance value in the frequency domain in which the absolute value of the resistance value was almost constant was $3.6 \times 10^2$ Ω, the proton conductivity was 130 mS/cm, and the proton conductivity showed a high value.

In addition, when an AC impedance was measured under measurement conditions of a temperature of 95° C. and a relative humidity (RH) of 1.8%, the resistance value in the frequency domain in which the absolute value of the resistance value was almost constant was $3.2 \times 10^2$ Ω, and the proton conductivity was 150 mS/cm.

In addition, when an AC impedance was measured under measurement conditions of a temperature 110° C. and a relative humidity (RH) of 1.5%, the resistance value in the frequency domain in which the absolute value of the resistance value was almost constant was $2.5 \times 10^2$ Ω, and the proton conductivity was 190 mS/cm.

In addition, when an AC impedance was measured under measurement conditions of a temperature of 120° C. and a relative humidity (RH) of 1.4%, the resistance value in the frequency domain in which the absolute value of the resistance value was almost constant was $2.2 \times 10^2$ Ω, and the proton conductivity was 210 mS/cm.

Thus, it was found that, in the proton conducting film of Example 1, the proton conductivity tended to increase as the temperature increased. This is thought to be caused by the fact that the molecular mobility of a proton conducting mixed phase in a quasi-fluid state increased as the temperature increased, and as a result, the proton conductivity was improved.

In addition, it was confirmed that the proton conducting film of the present disclosure had a very high proton conductivity of about 100 mS/cm or more under non-humidified conditions and in a temperature range of 50 to 120° C.

In addition, when an AC impedance was measured in a temperature range of 50 to 120° C., the proton conducting film of the present disclosure maintained its film shape without flowing. Here, the glass transition temperature of polystyrene was 100° C. Therefore, it was thought that, at 120° C., the melt domain was formed rather than a glass state or crystalline state domain. It seemed that, at 120° C., since phase separation occurred in a melt matrix (a mixture phase of polyvinylpyridine and sulfuric acid) including a melt domain (polystyrene phase) and a plasticizer, the film did not flow in a short time and maintained its film shape, but in the melt domain, it was thought that an independent ability as a film was very weak and the film flowed in a long time.

The measurement results of the proton conductivity of Example 1 are shown in the following Table 2.

(Tensile Test)

The sample of the proton conducting film of Example 1 was punched out using a punching blade to produce a dog-bone type test piece with a width of 4 mm. The thickness of the test piece was about 0.82 mm. Regarding a measuring device, AGS-X with 50 N load cells and 50 N clip grips (commercially available from Shimadzu Corporation)

was used and a distance between grips was 3.1 mm and an initial strain rate of 0.33/s (a tension speed of 1.0 mm/s).

In the results of the tensile test of the sample of the proton conducting film of Example 1, the Young's modulus, the maximum stress, the elongation at break, and the internal area value of the stress-strain curve (an indicator of the strength of the material) were 0.10 MPa, 0.56 MPa, 840%, and 2.1 MJ/m$^3$, respectively, and the strength for the film was shown. In addition, the results are shown in the following Table 3.

Here, the Young's modulus was obtained from the initial gradient (within 10% of strain) of the stress-strain curve, the maximum stress was the maximum value of stress, and the elongation at break was obtained according to elongation when breaking occurred.

EXAMPLE 2

A proton conducting film of Example 2 was produced in the same manner as in Example 1 except that, in production of the proton conducting film of Example 1 described above, an amount of styrene monomers and an amount of 4-vinylpyridine monomers were appropriately changed, and an SPS triblock copolymer was produced according to the degree of polymerization, the molecular weight, and the molecular weight distribution shown in the following Table 1. Here, the purified SPS triblock copolymer of Example 2 is also abbreviated as "SPS-2."

TABLE 1

The degree of polymerization, the molecular weight, and the molecular weight distribution of SPS triblock copolymers of Examples 1 and 2

| | Abbreviation | Degree of polymerization (N)*[1] | Molecular weight (Mn)*[2] | Molecular weight distribution (D)*[3] |
|---|---|---|---|---|
| Example 1 | SPS-1 | 93-3370-93 | 9.7K-350K-9.7K | 1.92 |
| Example 2 | SPS-2 | 100-2500-100 | 10K-260K-10K | 1.47 |

*[1]Degree of polymerization is shown according to the form of "Block A-Block B-Block A"
*[2]Molecular weight is shown according to the form of "Block A-Block B-Block A"
*[3]Molecular weight distribution D is a value obtained according to Mw/Mn Here, the film thickness of the proton conducting film of Example 2 was 0.20 mm. In addition, the weight concentration of sulfuric acid contained was 80 mass %.

In the same manner as in Example 1, the glass transition temperature of the sample of the proton conducting film of Example 2 was measured, the leaving test with no load was performed thereon, and the AC impedance thereof was measured. Respective evaluation results are shown in the following Table 2.

Here, in measurement of the AC impedance, the sample of the proton conducting film of Example 2 was cut to a width of 2.7 mm and a length of 7.0 mm. In addition, the relative humidities at measurement temperatures are as follows.

50° C.: 6.0% RH, 80° C.: 2.5% RH, 95° C.: 1.8% RH, 110° C.: 1.6% RH, and 120° C.: 1.5% RH

EXAMPLE 3

A proton conducting film of Example 3 was produced in the same manner as in Example 1 except that, in production of the proton conducting film of Example 1 described above, the weight concentration of sulfuric acid contained in the proton conducting film was changed to 70 mass %, and the film thickness was adjusted to 0.72 mm.

In the same manner as in Example 1, the glass transition temperature of the sample of the proton conducting film of Example 3 was measured, the leaving test with no load was performed thereon, and the AC impedance thereof was measured. Respective evaluation results are shown in the following Table 2.

EXAMPLE 4

A proton conducting film of Example 4 was produced in the same manner as in Example 1 except that, in production of the proton conducting film of Example 1 described above, the weight concentration of sulfuric acid contained in the proton conducting film was changed to 60 mass %, and the film thickness was adjusted to 0.33 mm.

In the same manner as in Example 1, the glass transition temperature of the sample of the proton conducting film of Example 4 was measured, the leaving test with no load was performed thereon, and the AC impedance thereof was measured. Respective evaluation results are shown in the following Table 2.

EXAMPLE 5

A proton conducting film of Example 5 was produced in the same manner as in Example 1 except that, in production of the proton conducting film of Example 1 described above, the weight concentration of phosphoric acid was adjusted to 78 mass % using phosphoric acid ($H_3PO_4$) in place of sulfuric acid, and the film thickness was adjusted to 0.65 mm.

In the same manner as in Example 1, the glass transition temperature of the sample of the proton conducting film of Example 5 was performed, the leaving test with no load was performed thereon, and the AC impedance thereof was measured. Respective evaluation results are shown in the following Table 2.

TABLE 2

| | Block copolymer | | Plasticizer | | | Proton conducting film | | | | | | | |
|---|---|---|---|---|---|---|---|---|---|---|---|---|---|
| | | | | | | Film thickness (mm) | Glass transition temperature (° C.)*[3] | Leaving test with no load | Proton conductivity (mS/cm) | | | | | |
| | Type | Content (mass %) | Type | Content (mass %) | Form*[1] | | | | 50° C. | 80° C. | 95° C. | 110° C. | 120° C. | Film shape*[2] |
| Example 1 | SPS-1 | 20 | Sulfuric acid | 80 | Viscoelastic solid | 0.71 | Lower than −85° C. | A | 99 | 130 | 150 | 190 | 210 | Maintain |
| Example 2 | SPS-2 | 20 | Sulfuric acid | 80 | Viscoelastic solid | 0.20 | Lower than −85° C. | A | 77 | 100 | 110 | 140 | 150 | Maintain |

TABLE 2-continued

| | Block copolymer | | Plasticizer | | Proton conducting film | | | | | | | | | |
|---|---|---|---|---|---|---|---|---|---|---|---|---|---|---|
| | | | | | | Film | Glass | Leaving | | | | | | |
| | | Content | | Content | | thick- | transition | test | Proton conductivity (mS/cm) | | | | | |
| | Type | (mass %) | Type | (mass %) | Form*1 | ness (mm) | temperature (° C.)*3 | with no load | 50° C. | 80° C. | 95° C. | 110° C. | 120° C. | Film shape*2 |
| Example 3 | SPS-1 | 30 | Sulfuric acid | 70 | Viscoelastic solid | 0.72 | Lower than −85° C. | A | 43 | 67 | 77 | 90 | 100 | Maintain |
| Example 4 | SPS-1 | 40 | Sulfuric acid | 60 | Viscoelastic solid | 0.33 | −84° C. | A | 14 | 26 | 29 | 39 | 51 | Maintain |
| Example 5 | SPS-1 | 22 | Phosphoric acid | 78 | Viscoelastic solid | 0.65 | −59° C. | A | 3.2 | 12 | 21 | 32 | 37 | Maintain |

*1Form of the proton conducting film is a form confirmed at 50° C. or higher and 100° C. or lower
*2The film shape is a film shape during measurement of proton conductivity
*3Value that is measured by a differential scanning calorimeter and measured in a measurement range of −85° C. to 0° C.

As can be seen from the results in Table 2, it was found that the proton conducting film of the present disclosure exhibited high proton conductivity even in an anhydrous environment.

(Thermal Endurance Test)

The thermal endurance test was performed on the proton conducting film produced in the same manner as in Examples 1, 3 and 4 described above. The test results are shown in FIG. 2.

More specifically, the proton conducting films were heated at 80° C. for about 850 hours. Based on the change in percentage ($\sigma/\sigma_0$ (%)) of the proton conductivity of the proton conducting film over time, the thermal endurance of the proton conducting film was evaluated. Here, "σ" indicates a proton conductivity of the proton conducting film measured at an appropriate time during heating for about 850 hours, and "$\sigma_0$" indicates a proton conductivity of the proton conducting films immediately after being heated at 80° C.

Figure 2:
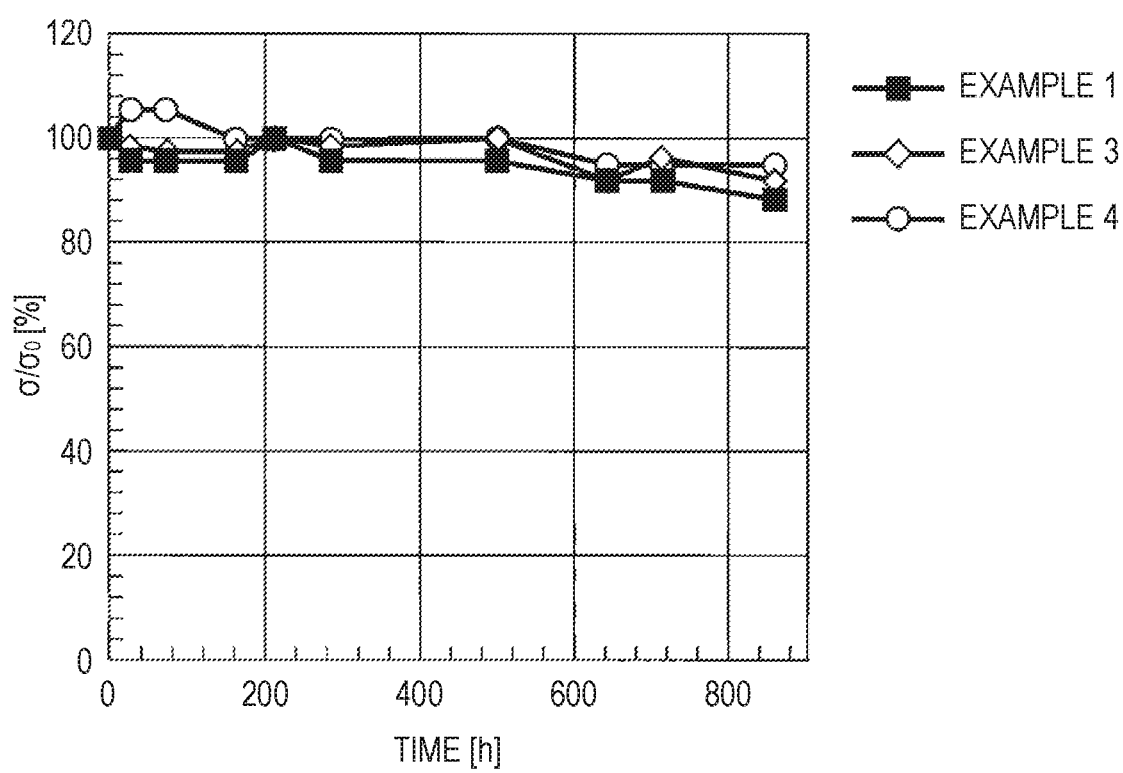
FIG. 2 is a diagram showing the thermal endurance of the proton conducting film of the present disclosure.

FIG. 2 is a diagram showing the thermal endurance of the proton conducting film of Examples 1, 3 and 4. As shown in FIG. 2, it was found that, even if heating was continued at 80° C. for about 850 hours, the proton conducting films of Examples 1, 3 and 4 maintained about 90% of the proton conductivity of the proton conducting films before heating, and the proton conductivity of respective proton conducting films showed almost no change over time.

Therefore, as can be seen from the results of the thermal endurance test, it was found that the proton conducting film of the present disclosure had high durability with respect to heat.

COMPARATIVE EXAMPLE 1

In Comparative Example 1, according to the following scheme 2, a P homopolymer having a proton accepting group was synthesized (first process), and sulfuric acid was contained therein to prepare a proton conducting film (second process).

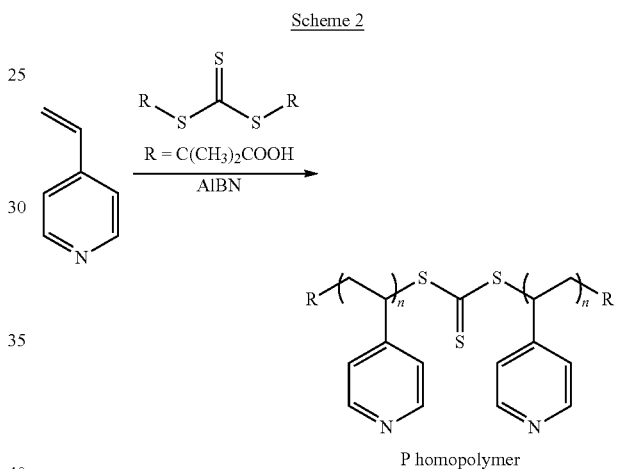

Scheme 2

(1) First Process

Unpurified 4-vinylpyridine monomers were passed through the column filled with basic alumina, and thereby the 4-vinylpyridine monomers were purified. Here, 39.6 g (0.376 mol) of the purified 4-vinylpyridine monomers, 101 mg (0.358 mmol) of an RAFT agent, and 29.4 mg (0.179 mmol) of AIBN were weighed out and mixed in a round bottom flask with a cock to prepare a solution. Then, bubbling was caused with nitrogen gas for 45 minutes, and polymerization was caused while stirring at 80° C. and 500 rpm using an oil bath at an atmospheric pressure. After one and a half hours, the flask was immersed in liquid nitrogen, and thereby the polymerization reaction was completely stopped.

Here, regarding the RAFT agent, S,S'-bis(α,α'-dimethyl-α''-acetic acid)trithio carbonate was used. In addition, the molar ratio between the 4-vinylpyridine monomers and the RAFT agent was about 1,050:1.

Next, chloroform was added to the reaction system to prepare about 8 mass % of a polymer solution. This solution was added dropwise into about 1,000 mL of n-hexane to precipitate a powdered poly(4-vinylpyridine). The obtained polymer was separated by suction filtration and sufficiently dried by vacuum drying, and then dissolved in chloroform again, and added dropwise into n-hexane to precipitate the polymer. The operation of precipitating a polymer was performed three times in total, unreacted monomers and low-molecular-weight oligomers were removed, and thereby a purified poly(4-vinylpyridine) (hereinafter abbreviated as "P4VP") was obtained.

The P4VP was dissolved in heavy chloroform to prepare about 2 mass % of a solution, and the average degree of polymerization was determined according to the $^1$H-NMR method. The average degree of polymerization was 399, and the average molecular weight was about 42,000. In addition, the polymer was dissolved in DMF to prepare about 0.5 mass % of a solution, and Mw/Mn was determined through GPC. A standard polystyrene was used for molecular weight calibration. The result was Mw/Mn=1.34. Here, measurement was performed when the effluent was DMF, the flow rate was 1 mL/min, and three TSK-GEL columns 4000HHR (commercially available from Tosoh Corporation) were connected.

(2) Second Process

A solution containing 32.8 mg of the P4VP obtained above, 133 mg of concentrated sulfuric acid (98%), and 4.16 g of methanol was prepared in a Teflon (registered trademark) beaker with a capacity of 10 mL, and the beaker was left on a hot plate at 50° C. for about 2 days, and methanol was removed. Then, drying was performed in a vacuum dryer at 50° C. for about 2 days, and thus methanol was completely removed to obtain a sample of Comparative Example 1.

(Evaluation Results)

The obtained sample of Comparative Example 1 was not chemically crosslinked and did not have a structure in which domains were crosslinked as in Example 1, and thus had fluidity in a molten state, and could not handle it as a film. Therefore, it was not possible to measure the proton conductivity of the sample obtained in Comparative Example 1 as a film.

REFERENCE EXAMPLE 1

<Production of Proton Conducting Film of Reference Example 1>

The P4VP obtained in Comparative Example 1 described above was reacted with a crosslinking agent, and thereby a post-crosslinking polymer (hereinafter referred to as "Post-CL-P" or "post-crosslinked P4 VP") having a pyridyl group as a proton accepting group in a repeating unit was synthesized.

More specifically, 1.01 g of P4VP obtained in the above Comparative Example 1 was dissolved in 9.94 g of a methanol solvent. Here, 0.0101 g of 1,4-dibromobutane as a crosslinking agent was added to this solution, the mixture was mixed well and then poured into a polymethylpentene petri dish (with an inner diameter of 8.5 cm), and left at 50° C. for about 2 days, and thus a volatile solvent (methanol) was evaporated, and a crosslinking reaction was caused. Then, drying was performed using a vacuum dryer at 50° C. for about 1 day, the volatile solvent was completely removed, and a post-crosslinked poly(4-vinylpyridine) (Post-CL-P) film was obtained.

Here, since the obtained Post-CL-P film did not dissolve in a good solvent such as methanol but it was swollen, it was found that this film was crosslinked.

The structure of Post-CL-P is shown in the following Formula 3.

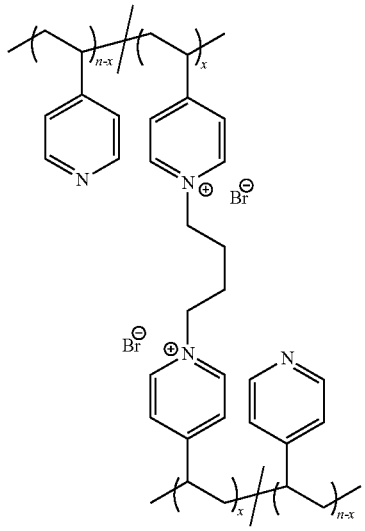

Formula 3

In the same manner as in Example 1, Post-CL-P was immersed in sulfuric acid to produce a sample of a film of Reference Example 1 having a weight concentration of sulfuric acid of 80 mass %. Here, the film thickness of the film of Reference Example 1 was 0.35 mm.

(Evaluation)

The tensile test was performed on the sample of Reference Example 1 in the same manner as in Example 1 except that a distance between grips was 5.9 mm and an initial strain rate was 0.33/s (tension speed of 1.9 mm/s). The results are shown in Table 3 together with the results of Example 1.

TABLE 3

| | Young's modulus (MPa) | Elongation at break (%) | Maximum stress (MPa) | Internal area value of stress-strain curve (MJ/m$^3$) |
|---|---|---|---|---|
| Example 1 | 0.10 | 840 | 0.56 | 2.1 |
| Reference Example 1 | 0.10 | 60 | 0.054 | 0.021 |

As can be seen from the results in Table 3, it was found that the proton conducting film of the present disclosure had greater elongation and strength than the film of Reference Example 1.

REFERENCE EXAMPLE 2

In Reference Example 2, the trend of change in the glass transition temperature (Tg) when a molar ratio of the proton donating compound (sulfuric acid) to the proton accepting groups (pyridyl groups) was changed was examined.

Regarding a polymer having a proton accepting group (pyridyl group) of Reference Example 2, P4VP in Comparative Example 1 described above was used.

P4VP and concentrated sulfuric acid (pKa: −3.0) (98%) were mixed at different molar ratios, and respective glass transition temperatures were measured. The results are shown in Table 4 and FIG. 3.

TABLE 4

| Mass % of sulfuric acid %[1] | Molar ratio of sulfuric acid to pyridyl groups[2] | Tg[3] (° C.) |
|---|---|---|
| 0 | 0.00 | 152[4] |
| 10 | 0.12 | 141 |
| 20 | 0.27 | 158 |
| 30 | 0.46 | 170 |
| 40 | 0.71 | 171 |
| 50 | 1.07 | 141 |
| 55 | 1.31 | 43 |
| 60 | 1.61 | −52 |
| 70 | 2.50 | −86 |
| 80 | 4.29 | Lower than −95 |

Figure 3:
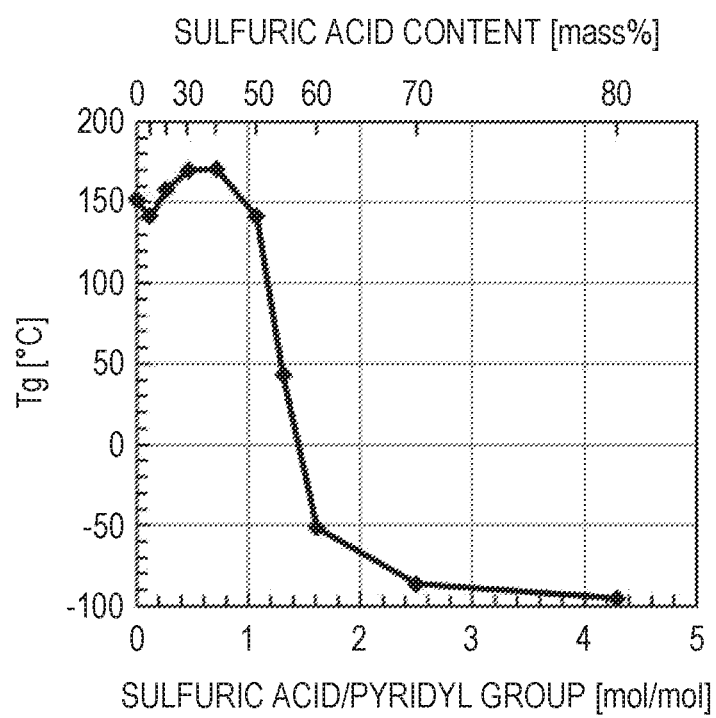
FIG. 3 is a diagram showing a trend of change in the glass transition temperature when a molar ratio of a proton donating compound to proton accepting groups of a polymer of Reference Example 2 is changed.

[1]"Mass % of sulfuric acid" is a value of mass % of sulfuric acid with respect to a total of 100 parts by mass % of the mixture containing P4VP and sulfuric acid
[2]"Molar ratio of sulfuric acid to pyridyl groups" is a value calculated from "number of moles of sulfuric acid/number of moles of pyridyl group"
[3]"Tg" is a value of a glass transition temperature of the mixture containing P4VP and sulfuric acid
[4]This value is a value of Tg when no sulfuric acid is included, that is, a value of Tg of P4VP itself As shown in Table 4 and FIG. 3, when the molar ratio of sulfuric acid to the pyridyl groups was 0.12 to 0.71, a trend in which Tg of the mixture containing P4VP and sulfuric acid was higher than Tg of P4VP itself was obtained. This is thought to be caused by the fact that most of the sulfuric acid formed an acid-base complex in which segment movement with the pyridyl group of P4VP was less likely to occur.

On the other hand, when the molar ratio of sulfuric acid to the pyridyl groups started to exceed 1, for example, when the molar ratio of sulfuric acid to the pyridyl groups was 1.1, a trend in which Tg of the mixture containing P4VP and sulfuric acid greatly decreased was obtained. This was thought to be caused by the fact that, when the molar ratio of sulfuric acid to the pyridyl groups exceeded 1, sulfuric acid functioned as a plasticizer, and segment movement of polymer chains was likely to actively occur.

Here, the results obtained above were not derived from the number of moles of protons contained in sulfuric acid but they were derived from the number of moles of sulfuric acid itself. It was thought that the results could be applied for all proton donating compounds.

REFERENCE EXAMPLE 3

In Reference Example 3, a trend in the change of the proton conductivity of the proton conducting film when the molar ratio of the proton donating compound (sulfuric acid) to the proton accepting groups (pyridyl groups) at 120° C. was changed was examined.

Figure 4:
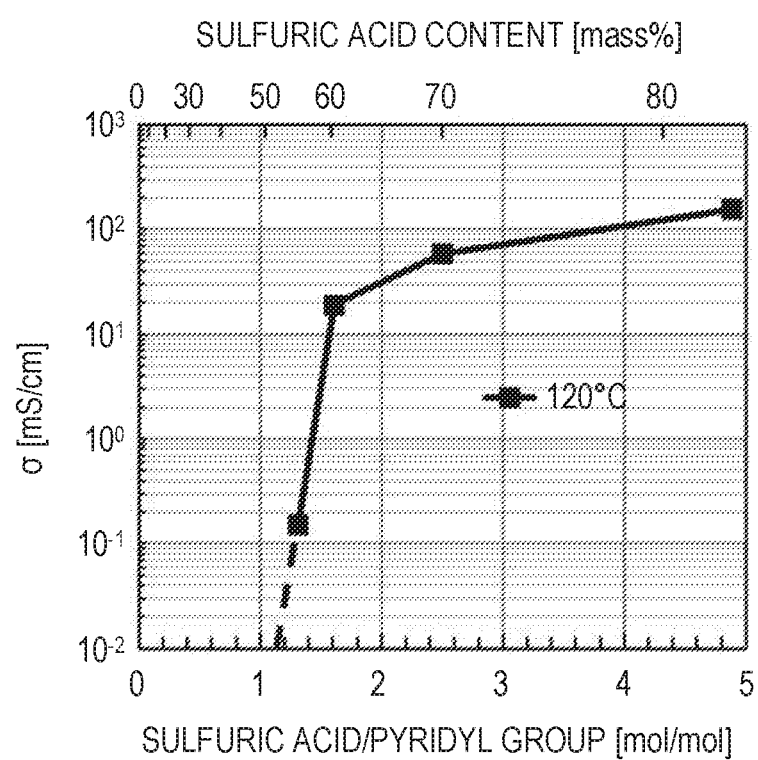
FIG. 4 is a diagram showing a trend of change in the proton conductivity when a molar ratio of a proton donating compound to proton accepting groups of a polymer of Reference Example 3 is changed.

In Reference Example 3, a crosslinked P4 VP was synthesized as follows. In addition, a proton conducting film was prepared in the same manner as in Example 1 except that the synthesized crosslinked P4 VP and concentrated sulfuric acid (pKa:−3.0) (98%) as a plasticizer were used, and thus the content of sulfuric acid was changed, and the proton conductivity at 120° C. was examined. The results are shown in FIG. 4.

(Synthesis of Crosslinked P4 VP)

Unpurified 4-vinylpyridine was caused to pass through a column filled with basic alumina for purification.

Here, 2.00 g (19.0 mmol) of 4-vinylpyridine (4VP), 50.3 mg (0.326 mmol) of crosslinkable N,N'-methylenebisacrylamide (MBAA), and 2.0 mg (0.012 mmol) of azobisisobutyronitrile (AIBN) as a radical polymerization initiator were mixed in a sample bottle to obtain a raw material solution. The mass ratio of 4VP:MBAA:radical polymerization initiator in the raw material solution was about 1,000:25:1. In addition, the molar ratio of 4VP:MBAA:radical polymerization initiator in the raw material solution was about 1,583:27:1.

Bubbling was caused in the raw material solution with nitrogen gas for 45 minutes, and then the temperature was raised to 70° C. at an atmospheric pressure using an oil bath, and a polymerization reaction was caused for 3.5 hours while stirring at 500 rpm. After the reaction was completed, the sample bottle was removed from the oil bath, and left on a hot plate at 50° C. for 2 days. After 2 days, it was confirmed that the sample in the sample bottle was in a glass state.

Here, 40 mL of methanol was added to the sample in the sample bottle and immersion was performed for 1 hour. After 1 hour, methanol was removed, and the same amount of new methanol was added thereto and immersion was performed again for 1 hour. This methanol immersion operation was repeated three times, and unreacted monomers, low-molecular-weight oligomers, and the like were removed for purification. Next, the mixture was left on a hot plate at 50° C. for 1 day, and then dried in a vacuum dryer at 50° C. for 12 hours and thus methanol was completely removed to obtain crosslinked poly(4-vinylpyridine) (crosslinked P4 VP).

The structure of the obtained crosslinked P4 VP is shown in the following Formula 4.

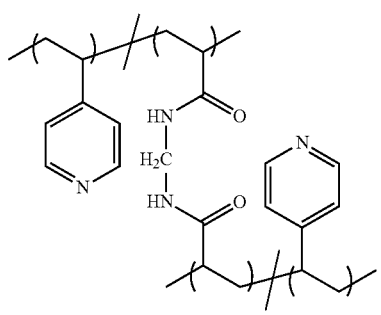

Formula 4

As shown in FIG. 4, when the molar ratio of sulfuric acid to the pyridyl groups was less than 1.1 (sulfuric acid content of 50 mass %), the proton conductivity could not be estimated by impedance measurement because the resistance was high (indicated by a dotted line).

On the other hand, it was found that, regarding the molar ratio of sulfuric acid to the pyridyl groups, when the value of the molar ratio increased from 1.3 (sulfuric acid content of 55 mass %) to 1.6 (sulfuric acid content of 60 mass %), the proton conductivity increased by two or 3 orders of magnitude. This was thought to be caused by a sharp increase in the proton conductivity due to increase in the concentration of free protons derived from an excess amount of sulfuric acid which was not used to form the acid-base complex.

Based on the results of Reference Examples 2 and 3 described above, it was found that, when a proton donating compound was impregnated into a crosslinked polymer having a proton accepting group on the side chain, if a plasticizer containing a proton donating compound in an amount larger than the number of moles of the proton accepting group was contained, the glass transition temperature decreased sharply, and the proton conductivity under non-humidified conditions increased sharply.

What is claimed is:

1. A proton conducting film comprising:
   a polymer having a first part and a second part which are connected by a covalent bond; and
   a plasticizer,
   wherein the first parts aggregate with each other to form a domain at an operation temperature of the proton conducting film, and the second part crosslinks the domains, and
   the second part has a proton accepting group, and the plasticizer contains a proton donating compound having a pKa of 2.5 or less, and thus the plasticizer penetrates into the second part, and a glass transition temperature of the polymer is lowered compared to when the plasticizer is not included.

2. The proton conducting film according to claim 1, wherein
   the domain is in a glass state or crystalline state.

3. The proton conducting film according to claim 1, wherein
   the polymer is a block copolymer,
   the first part is a block A of the block copolymer, and
   the second part is a block B of the block copolymer.

4. The proton conducting film according to claim 1, wherein
   a molar ratio of the proton donating compound to the proton accepting group is 1.0 or more and 10.0 or less.

5. The proton conducting film according to claim 1, wherein
   the proton conducting film is a viscoelastic solid in a temperature range of 50° C. or higher and 100° C. or lower.

6. The proton conducting film according to claim 1, wherein
   a content of the plasticizer is 50 parts by mass or more and 90 parts by mass or less with respect to a total of 100 parts by mass of the polymer and the plasticizer.

7. The proton conducting film according to claim 1, wherein
   the proton donating compound is at least one selected from among sulfuric acid and phosphoric acid.

8. The proton conducting film according to claim 1, wherein
   the proton accepting group is a nitrogen-containing heterocyclic group.

9. The proton conducting film according to claim 8, wherein
   the nitrogen-containing heterocyclic group is a pyridine ring group or an imidazole ring group.

10. The proton conducting film according to claim 1, wherein
    the first part is a polystyrene-based polymer.

11. The proton conducting film according to claim 3, wherein
    the block copolymer is an A-B-A type triblock copolymer including the block A and the block B.

12. The proton conducting film according to claim 1, wherein
    a film thickness of the proton conducting film is 1.00 mm or less.

13. The proton conducting film according to claim 1, wherein
    a proton conductivity of the proton conducting film at 50° C. is 10 mS/cm or more.

14. The proton conducting film according to claim 1, wherein
    an ionic interaction occurs between free protons released from the proton donating compound, the proton donating compound which is anionized due to release of protons, and the proton accepting group which is cationized due to binding to the free protons.

15. A fuel cell comprising:
    a fuel electrode side separator having a fuel flow path;
    a fuel electrode side catalyst layer;
    the proton conducting film according to claim 1;
    an air electrode side catalyst layer; and
    an air electrode side separator having an air flow path.

* * * * *